United States Patent
Barclay et al.

(10) Patent No.: US 6,720,383 B2
(45) Date of Patent: Apr. 13, 2004

(54) CURABLE COMPOSITIONS OF CHLORINATED POLYOLEFIN ELASTOMERS

(75) Inventors: James Reynolds Barclay, Denham Springs, LA (US); Raymond Lynn Laakso, Jr., St. Francisville, LA (US); Jeff Michael Savoie, Baton Rouge, LA (US); Larry Benton White, Baker, LA (US)

(73) Assignee: DuPont Dow Elastomers Inc., Wilmington, DE (US)

( * ) Notice: Subject to any disclaimer, the term of this patent is extended or adjusted under 35 U.S.C. 154(b) by 299 days.

(21) Appl. No.: 09/902,959

(22) Filed: Jul. 11, 2001

(65) Prior Publication Data

US 2002/0042464 A1 Apr. 11, 2002

Related U.S. Application Data

(60) Provisional application No. 60/226,193, filed on Aug. 18, 2000.

(51) Int. Cl.[7] .............................................. C08L 27/00
(52) U.S. Cl. .................. 524/567; 524/296; 524/297; 524/298; 524/445; 524/449; 524/576; 524/581
(58) Field of Search ................................. 524/296, 297, 524/298, 445, 449, 451, 567, 576, 581

(56) References Cited

U.S. PATENT DOCUMENTS

| | | | |
|---|---|---|---|
| 3,260,694 A | 7/1966 | Wang | |
| 3,454,544 A | 7/1969 | Young et al. | |
| 3,485,788 A | 12/1969 | Csaszar | |
| 3,532,666 A | 10/1970 | Csaszar | |
| 3,821,139 A | 6/1974 | Alia | |
| 4,753,971 A | 6/1988 | Davis et al. | |
| 4,767,823 A | 8/1988 | Jones et al. | |
| 4,822,838 A | 4/1989 | Watanabe et al. | |
| 5,274,013 A | 12/1993 | Lieux | |
| 5,466,757 A | 11/1995 | Watanabe et al. | |

FOREIGN PATENT DOCUMENTS

EP 618260 10/1994

*Primary Examiner*—Peter D. Mulcahy

(57) ABSTRACT

Chlorinated olefin elastomers prepared from olefin polymer base resins having $I_{10}$ values of 0.05–0.8 dg/minute are blended with curative and at least 300 phr of an additive package to form a curable composition having excellent properties. Cured compositions provide superior insulating layers for wire and cable applications.

12 Claims, No Drawings

CURABLE COMPOSITIONS OF CHLORINATED POLYOLEFIN ELASTOMERS

CROSS-REFERENCE TO RELATED APPLICATIONS

This application claims the benefit of U.S. Provisional Application No. 60/226,193 filed Aug. 18, 2000.

FIELD OF THE INVENTION

This invention relates to improved chlorinated polyolefin elastomer curable compositions which contain relatively high levels of additives.

BACKGROUND OF THE INVENTION

Chlorinated polyethylene elastomers and chlorinated ethylene copolymer elastomers have been found to be very good elastomeric materials for use in applications such as wire and cable jacketing, molded goods and automotive hose.

Curable compositions of these elastomers generally contain various types of additives such as fillers, plasticizers, processing aids and acid acceptors in order to render the compositions more suitable for a particular application. The maximum amount of an additive which may be incorporated into a curable elastomer composition is determined by the point at which no additional additive may be introduced without causing a parameter (e.g. tensile strength, elongation, conductivity, etc.) of the cured composition to fall outside of the specifications for a particular end use application. However, it is sometimes desirable to further increase the amount of an additive in such curable compositions in order to improve a different parameter (e.g. processability of the composition or a different physical property of the cured composition), or to reduce the cost of the composition. Therefore, there is a need for a chlorinated polyolefin elastomer composition which can incorporate higher levels of additives than has been possible heretofore, without causing one or more parameters of the cured composition to fall outside of specifications.

SUMMARY OF THE INVENTION

It has been surprisingly discovered that curable chlorinated olefin elastomer compositions, containing a higher level of additives than was possible in the past, can be prepared from certain very high molecular weight elastomers. Cured articles prepared from these compositions have excellent elastomeric physical properties and readily pass industry testing standards such as Underwriters Laboratory (UL) 62 specifications for elastomers to be used in wire and cable jacketing.

One aspect of the present invention is specifically directed to an improved curable elastomer composition comprising: A) a chlorinated olefin elastomer having a chlorine content of from 15–48 percent by weight; said chlorinated olefin elastomer being prepared from an olefin polymer selected from the group consisting of i) polyethylene homopolymers having $I_{10}$ values of from 0.05–0.8 dg/minute and ii) copolymers of ethylene and up to 25 weight percent of a copolymerizable monomer, said copolymers having $I_{10}$ values of from 0.05–0.8 dg/minute; and B) at least 300 phr of an additive package.

Another aspect of the present invention is a jacket for wire and cable. The jacket is made from a cured elastomer composition comprising A) a chlorinated olefin elastomer having a chlorine content of from 15–48 percent by weight; said chlorinated olefin elastomer being prepared from an olefin polymer selected from the group consisting of i) polyethylene homopolymers having $I_{10}$ values of from 0.05–0.8 dg/minute and ii) copolymers of ethylene and up to 25 weight percent of a copolymerizable monomer, said copolymers having $I_{10}$ values of from 0.05–0.8 dg/minute; and B) at least 300 phr of an additive package.

DETAILED DESCRIPTION OF THE INVENTION

One aspect of the present invention is a curable chlorinated olefin elastomer composition comprising a very high molecular weight elastomer, a very high level of additives and, optionally a curative. The elastomer may be amorphous or semi-crystalline. These highly filled compositions are especially useful in the manufacture of jacketing and integral insulation/jacketing for wire and cables.

The chlorinated olefin elastomer component of the compositions of the invention is selected from the group consisting of a) chlorinated polyethylene homopolymers prepared from polyethylenes having an $I_{10}$ value of from 0.05–0.8 dg/minute and b) chlorinated ethylene copolymers prepared from ethylene copolymers having an $I_{10}$ value of from 0.05–0.8 dg/minute that comprise copolymerized units of i) ethylene and ii) up to 25 weight percent (based on the total weight of monomers) of a copolymerizable monomer.

Representative chlorinated ethylene copolymers include those prepared from copolymers comprising ethylene and at least one ethylenically unsaturated monomer selected from the group consisting of $C_3$–$C_{10}$ alpha monoolefins; $C_1$–$C_{12}$ alkyl esters of $C_3$–$C_{20}$ monocarboxylic acids; unsaturated $C_3$–$C_{20}$ mono- or dicarboxylic acids; anhydrides of unsaturated $C_4$–$C_8$ dicarboxylic acids; and vinyl esters of saturated $C_2$–$C_{18}$ carboxylic acids. Chlorinated graft copolymers are included as well.

Specific examples of suitable chlorinated ethylene copolymers which may be employed in the compositions of this invention include, but are not limited to chlorinated ethylene vinyl acetate copolymers; chlorinated ethylene acrylic acid copolymers; chlorinated ethylene methacrylic acid copolymers; chlorinated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; and chlorinated copolymers of ethylene with propylene, butene, 3-methyl-1-pentene, or octene. The copolymers may be dipolymers, terpolymers, or higher order copolymers. Chlorinated polyethylene is a preferred chlorinated olefin elastomer.

A particular feature of the chlorinated olefin elastomers of the present invention is that they have very high molecular weights because they are prepared from polyolefin base resins having very high molecular weights. That is, the polyolefin base resins are characterized by having $I_{10}$ melt index values of from 0.05 dg/minute to 0.8 dg/minute, preferably from 0.3 to 0.8 dg/minute, most preferably from 0.5 to 0.8 dg/minute. $I_{10}$ melt indices within the broad range of 0.05–0.8 dg/minute correspond generally to weight average molecular weights of 400,000–1,000,000 daltons. Olefin polymers having $I_{10}$ melt indices below 0.05 are difficult to manufacture. Olefin polymers having $I_{10}$ melt indices above 0.8 dg/minute cannot accept the high levels of additives used in the compositions of this invention without causing at least one parameter (e.g. tensile strength, elongation, hardness, modulus, electrical resistance, compression set resistance, etc.) of the cured composition to fall outside of the specifications for a particular end use application.

The chlorinated olefin elastomers useful in the practice of the invention contain 15–48 weight percent chlorine, preferably 25 to 38 weight percent chlorine. Because the molecular weight of the non-chlorinated polyolefin base resins is from approximately 400,000–1,000,000 daltons, the chlorinated olefin elastomers employed in the compositions of this invention will be of very high molecular weight, relative to the majority of the commercially available chlorinated olefin elastomers.

The chlorinated olefin elastomers suitable for use in the compositions of the invention may be prepared from polyolefin resins that are branched or unbranched. The polyolefin base resins may be prepared by free radical processes, Ziegler-Natta catalysis or catalysis with metallocene catalyst systems, for example those disclosed in U.S. Pat. Nos. 5,272,236 and 5,278,272. Chlorination of the base resins may take place in suspension, solution, solid state or fluidized bed. Free radical suspension chlorination processes are described and taught in U.S. Pat. Nos. 3,454,544, 4,767,823 and references cited therein. Such processes involve preparation of an aqueous suspension of a finely divided ethylene polymer which is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823.

The compositions of this invention may, optionally, further comprise one or more other polymers blended with the chlorinated olefin elastomer. Examples of such other polymers include, but are not limited to ethylene/alpha olefin elastomers, EPDM, chlorosulfonated polyethylene, polychloroprene, ethylene vinyl acetate and chlorinated polyethylene resin. When such polymers are present in the compositions of this invention, their total amount is generally in the range of 1 to 50 (preferably 5 to 25) parts by weight per 100 parts by weight of chlorinated olefin elastomer. For the purposes of this invention, such polymers are not considered to be part of the additive package as defined hereinafter.

At least 300 parts by weight of an additive package per 100 parts by weight of chlorinated olefin elastomer is incorporated into the compositions of the invention. The latter units are often referred to as "parts per 100 parts rubber" or "phr" in the art. Typically more than one type of additive will be included in the additive package. It is not necessary that each additive be present in an amount of at least 300 phr, only that the total amount of the various additives in the package be at least 300 phr. Preferably, at least 350 phr of an additive package is employed.

Examples of additives suitable for use in the compositions of this invention include, but are not limited to i) fillers; ii) plasticizers; iii) process aids; iv) acid acceptors; v) antioxidants; and vi) antiozonants. The term "additive" as used herein specifically excludes polymers such as other elastomers, crystalline thermoplastic polyolefin resins and crystalline chlorinated thermoplastic polyolefin resins which may be present in the compositions of this invention. Thus the level of such polymers is not included in the level of the additive package.

Examples of suitable fillers include, but are not limited to carbon black (20–120 phr), talc (20–150 phr), silica (5–50 phr), clays (50–300 phr), calcium carbonate (50–300 phr), titanium dioxide (5–20 phr), and colorants (1–10 phr). When one or more of these fillers are employed in the compositions of the invention, the typical level of each filler is shown in parentheses next to the filler.

Examples of plasticizers include, but are not limited to dioctyl phthalate (DOP), diisononyl phthalate (DINP), dioctyl adipate (DOA), trioctyltrimellitate (TOTM), dioctyl sebacate (DOS), diundecyl phthalate (DUP), certain polymeric esters such as Paraplex® series (available from C. P. Hall), and chlorinated paraffins. When incorporated in the compositions of the invention, plasticizers are typically used at a level between 20–100 phr, preferably 30–60 phr.

Examples of processing aids include, but are not limited to lubricants such as paraffin wax, oxidized polyethylene wax and Struktol® WB212 (Struktol Company of America). When incorporated in the compositions of the invention, processing aids are typically used at a level between 1–8 phr, preferably 1–4 phr.

Examples of acid acceptors include, but are not limited to organic amines, epoxidized resins, metal oxides and metal hydroxides. When incorporated in the compositions of the invention, acid acceptors are typically used at a level between 1–8 phr, preferably 2–6 phr.

Many different commercially available antioxidants and antiozonants may be employed in the compositions of the invention. When present, they are typically at a level between 0.2–3 phr.

The compositions of this invention may further comprise a curative. Suitable curatives include organic peroxides and thiadiazoles. Alternatively the curable compositions of this invention may be cured by electron beam radiation.

Examples of organic peroxides include, but are not limited to α, α'-bis(tert-butylperoxy) diisopropylbenzene; dicumyl peroxide; and butyl-4,4-bis(t-butylperoxy) valerate. α, α'-bis(tert-butylperoxy) diisopropylbenzene is preferred.

An example of a thiadiazole curative is a dimercaptothiadiazole derivative (e.g. Echo® A, available from Hercules).

Typically the amount of active curative used in the compositions of the invention is between 1 to 5 phr, preferably 2 to 3 phr.

When an organic peroxide is used as curative, a multifunctional coagent is also present in the composition. Coagents may also be employed if the composition is to be cured with electron beam radiation. Examples of such coagents include, but are not limited to trimethylolpropane trimethacrylate (TMPTMA); triallylcyanurate (TAC); triallylisocyanurate (TAIC); triallyltrimellitate (TATM); and diallylphthalate (DAP). TMPTMA is preferred. When employed in the compositions of the invention, the amount of coagent is typically between 2 to 15 phr.

The curable compositions of this invention are typically made by blending i) the chlorinated olefin elastomer, ii) additive package and, iii) optional curative in an internal mixer such as a Banbury®, available from the Farrell Corp. The mixing temperature is kept below the decomposition temperature of any curative present. All the ingredients of the composition may be charged to the mixer at one time. Alternatively, the ingredients may be charged to the mixer step-wise wherein all the dry ingredients (except for the chlorinated olefin elastomer and any other polymers) are introduced first, followed by liquid material and then by the elastomer and optional other polymer(s).

The curable compositions of this invention may be advantageously utilized in many end use applications including wire and cable jacketing, hoses, and molded goods.

In most end use applications, the curable composition will first be formed into the desired final shape (i.e. by extrusion, molding, etc.) and then cured by application of heat or radiation, depending upon the type of curative employed in the composition and the particular end use application.

Another aspect of the present invention is a jacket for wire and cable. The jacket may be employed as simply the outer protective coating of a wire or cable, or it may be used as a combination insulation layer/protective jacket for wire or cable. This jacket comprises a cured chlorinated olefin elastomer compound, said compound comprising A) a chlorinated olefin elastomer having a chlorine content of from 15–48 percent by weight; said chlorinated olefin elastomer being prepared from an olefin polymer selected from the group consisting of i) polyethylene homopolymers having $I_{10}$ values of from 0.05–0.8 dg/minute and ii) copolymers of ethylene and up to 25 weight percent (based on the total weight of monomers) of a copolymerizable monomer, said copolymers having $I_{10}$ values of from 0.05–0.8 dg/minute; and B) at least 300 phr of an additive package.

The jacket is typically made by extruding a curable elastomer composition of the invention either i) directly onto a wire or cable core, or ii) onto an insulating layer intermediate between said core and the jacket of this invention. The composition is then cured by suitable means such as by heat or radiation. Often, curing is performed in a continuous vulcanization (CV) operation which is well known to those skilled in the manufacture of wire and cable. The resulting jacket of the invention meets the specifications of various testing protocols including Underwriters Laboratories (UL) 62.

The invention is further illustrated by the following embodiments wherein all parts are by weight unless otherwise indicated.

EXAMPLES

Test Methods
Ultimate tensile strength was determined according to ASTM D412.
Elongation at break (%) was determined according to ASTM D412.
Hardness, Shore A was determined according to ASTM D2240.

Example 1

A very high molecular weight chlorinated polyethylene elastomer, CPE-1, having a chlorine content of 36 wt. % and a heat of fusion (an indicator of residual crystallinity) of <0.2 cal/g was prepared in a slurry process from a polyethylene having a melt index ($I_{10}$) of 0.6 dg/minute, substantially according to the procedure described in U.S. Pat. No. 4,767,823 and references cited therein.

A lower molecular weight chlorinated polyethylene elastomer, CPE-2, having a chlorine content of 36 wt. % and a heat of fusion <0.2 cal/g was prepared in a slurry process from a polyethylene having a melt index ($I_{10}$) of 2.5 dg/minute, substantially according to the procedure described in U.S. Pat. No. 4,767,823 and references cited therein. CPE-2 is representative of many commercially available chlorinated polyethylenes and is similar to Tyrin® CM 0836 (DuPont Dow Elastomers L.L.C.).

Sample 1, a curable composition of the invention, was made by compounding the ingredients shown in Table I in a Banbury® mixer. First, all of the dry ingredients were charged to the mixer, which was operating at low rotor speed under full cooling. Next, the liquid ingredient was added, followed by the elastomer. The ram of the mixer was lowered to initiate the mixing process. A 75% full volume was targeted. At a stock temperature of 70°–75° C., the ram was raised to clear the mixer. Any materials that had not fully entered the mixing chamber were swept into the chamber. The ram was then lowered and mixing continued until a melt temperature of 99°–100° C. was reached. The resulting composition was then discharged onto a cold two roll mill where it was cooled and converted into slabstock form.

Comparative Sample A, comprising the ingredients shown in Table I was made in the same manner as Sample 1.

Plaques were prepared by compression molding the Samples for 2 minutes at 204° C. to effect a cure. Physical property data for the cured plaques, as well as the UL 62 specifications for the employment of these samples in wire and cable jacketing, are shown in Table II.

It can be seen that cured parts made from the composition of the invention (Sample 1—heavily loaded and high molecular weight CPE) met all of the UL 62 specifications, whereas cured parts made from Comparative Sample A (heavily loaded, but wherein the elastomer was made from a PE having too low a molecular weight (i.e. $I_{10}$>0.8 dg/min.)) failed to meet the UL 62 ultimate tensile specification.

TABLE I

| Ingredient, phr | Sample 1 | Comparative Sample A |
|---|---|---|
| Elastomer CPE-1 | 100 | 0 |
| Elastomer CPE-2 | 0 | 100 |
| Saret ® SR 517[1] | 5 | 5 |
| Vulcup ® 40KE[2] | 5 | 5 |
| N-774 Black[3] | 80 | 80 |
| Atomite ®[4] | 200 | 200 |
| DINP[5] | 60 | 60 |
| StanMag ® AG[6] | 5 | 5 |
| Total Additives | 345 | 345 |

[1]Trimethylolpropane trimethacrylate curing coagent available from Sartomer.
[2]α,α'-bis(tert-butylperoxy)-diisopropylbenzene peroxide curative dispersed on Burgess KE clay, available from Hercules.
[3]Carbon Black with the ASTM designation N-774.
[4]Calcium carbonate available from ECC America.
[5]Diisononyl phthalate plasticizer available from the C.P. Hall Company.
[6]Magnesium oxide available from Harwick.

TABLE II

| Property | Sample 1 | Comparative Sample A | UL 62 Specification |
|---|---|---|---|
| Ultimate tensile, MPa | 8.43 | 7.59 | 8.27 minimum |
| Elongation, % | 309 | 311 | 200 minimum |
| Hardness, Shore A | 79 | 77 | — |

Example 2

A high molecular weight chlorinated polyethylene elastomer, CPE-3, having a chlorine content of 33 wt. % and a heat of fusion (an indicator of residual crystallinity) of <0.2 cal/g was prepared in a slurry process from a polyethylene having a melt index ($I_{10}$) of 0.6 dg/minute, substantially according to the procedure described in U.S. Pat. No. 4,767,823 and references cited therein.

Test plaques (Sample 3) containing CPE-3 were prepared as described in Example 1 using the same (except for the elastomer) recipe and the same mixing procedure. Results are shown in Table III. Also included in Table III are the results of aging the test plaques: 1) in IRM 902 oil for 18 hours at 121° C. and 2) in an air oven for 10 days at 110° C. The highly filled recipe employing the high molecular weight CPE-3 elastomer passed the UL 62 spec. for physical property requirements, both as-cured and after aging.

TABLE III

| Properties | Sample | UL 62 Spec for 90° C. Flex Cord |
|---|---|---|
| As-cured | | |
| Ultimate Tensile, MPa [psi] | 8.83 [1280] | 8.27 min [1200] |
| Elongation at Break, % | 291 | 200 min |
| Hardness, Shore A | 79 | |
| Aged in IRM 902/18 h/121° C. | | |
| Tensile Retention, % | 96.3 | 60 min |
| Elongation Retention, % | 85.6 | 60 min |
| Aged in air/10 days/110° C. | | |
| Tensile Retention, % | 91.9 | 50 min |
| Elongation Retention, % | 77 | 50 min |

Example 3

A high molecular weight chlorinated polyethylene elastomer, CPE-4, having a chlorine content of 34 wt. % and a heat of fusion (an indicator of residual crystallinity) of <0.2 cal/g was prepared in a slurry process from a polyethylene having a melt index ($I_{10}$) of 0.6 dg/minute, substantially according to the procedure described in U.S. Pat. No. 4,767,823 and references cited therein.

A composition of the invention (Sample 4 containing CPE-4) and a prior art composition (Comparative Sample B containing CPE-2) were prepared by the same mixing procedure as described in Example 1. The ingredients in the compositions are shown in Table IV.

The compositions were extruded onto 14 AWG (1.63 mm diameter) solid aluminum wire as a 30 mil (0.762 mm) jacket using a 1.5 inch (38.1 mm) extruder. The jacket was cured in a continuous vulcanization (CV) tube for 2 minutes in 245 psi (1.69 MPa) steam (about 200° C). Results of physical property testing are shown in Table V. Also included in Table V are the results of aging the jackets: 1) in IRM 902 oil for 18 hours at 121° C and 2) in an air oven for 10 days at 110° C. The jacket made from the highly filled recipe that contained high molecular weight CPE-4 elastomer (i.e. Sample 4) passed the UL 62 spec. for physical property requirements, both as-cured and after aging. However, the jacket made from Comparative Sample B (containing lower molecular weight chlorinated polyethylene CPE-2) failed the ultimate tensile strength and IM 902 elongation retention tests.

TABLE IV

| Ingredient, phr | Sample 4 | Comparative Sample B |
|---|---|---|
| Elastomer CPE-4 | 100 | 0 |
| Elastomer CPE-2 | 0 | 100 |
| Saret ® SR 517[1] | 5 | 5 |
| Vulcup ® 40KE[2] | 5 | 5 |
| N-774 Black[3] | 80 | 80 |
| Atomite ®[4] | 200 | 200 |
| DINP[5] | 60 | 60 |

TABLE IV-continued

| Ingredient, phr | Sample 4 | Comparative Sample B |
|---|---|---|
| Paraffin Wax 130F | 1.5 | 1.5 |
| StanMag ® AG[6] | 5 | 5 |
| Total Additives | 356.5 | 356.5 |

[1]Trimethylolpropane trimethacrylate curing coagent available from Sartomer.
[2]α,α'-bis(tert-butylperoxy)-diisopropylbenzene peroxide curative dispersed on Burgess KE clay, available from Hercules.
[3]Carbon Black with the ASTM designation N-774.
[4]Calcium carbonate available from ECC America.
[5]Diisononyl phthalate plasticizer available from the C.P. Hall Company.
[6]Magnesium oxide available from Harwick.

TABLE V

| Properties | Sample | Comparative Sample B | UL 62 Spec for 90° C. Flex Cord |
|---|---|---|---|
| As-cured | | | |
| Ultimate Tensile, MPa [psi] | 9.78 [1418] | 7.57 [1099] | 8.27 min [1200] |
| Elongation at Break, % | 350 | 518 | 200 min |
| Aged in IRM 902/18 h/121° C. | | | |
| Tensile Retention, % | 94.5 | 89.6 | 60 min |
| Elongation Retention, % | 86 | 57.7 | 60 min |
| Aged in air/10 days/110° C. | | | |
| Tensile Retention, % | 97.7 | 108.3 | 50 min |
| Elongation Retention, % | 78.6 | 52.3 | 50 min |

What is claimed is:

1. A curable elastomer composition comprising:
   A) a chlorinated olefin elastomer having a heat of fusion <0.2 calories/gram and having a chlorine content of from 15–48 percent by weight; said chlorinated olefin elastomer being prepared from an olefin polymer selected from the group consisting of i) polyethylene homopolymers having $I_{10}$ values of from 0.05–0.8 dg/minute and ii) copolymers of ethylene and up to 25 weight percent of a copolymerizable monomer, said copolymers having $I_{10}$ values of from 0.05–0.8 dg/minute;
   B) at least 300 phr of an additive package; and
   C) a curative.

2. The curable composition of claim 1 wherein said additive package comprises at least one ingredient selected from the group consisting of i) fillers; ii) plasticizers; iii) process aids; iv) acid acceptors; v) antioxidants; vi) antiozonants; and vii) combinations thereof.

3. The curable composition of claim 2 wherein said filler is selected from the group consisting of carbon black, talc, mica, silica, clay, calcium carbonate, titanium dioxide, colorants and combinations thereof.

4. The curable composition of claim 2 wherein said plasticizer is selected from the group consisting of dioctyl phthalate, diisononyl phthalate, dioctyl adipate, trioctyltrimellitate, dioctyl sebacate, diundecyl phthalate, and chlorinated paraffins.

5. The curable composition of claim 2 wherein said process aid is selected from the group consisting of paraffin wax and oxidized polyethylene wax.

6. The curable composition of claim 1 wherein said curative is selected from the group consisting of organic peroxides and thiadiazoles.

7. A jacket for wire and cable comprising a cured chlorinated olefin elastomer compound, said compound comprising:
   A) a chlorinated olefin elastomer having a heat of fusion <0.2 calories/gram and having a chlorine content of from 15–48 percent by weight; said chlorinated olefin elastomer being prepared from an olefin polymer selected from the group consisting of i) polyethylene homopolymers having $I_{10}$ values of from 0.05–0.8 dg/minute and ii) copolymers of ethylene and up to 25 weight percent of a copolymerizable monomer, said copolymers having $I_{10}$ values of from 0.05–0.8 dg/minute;
   B) at least 300 phr of an additive package; and
   C) a curative.

8. The jacket of claim 7 wherein said additive package comprises at least one ingredient selected from the group consisting of i) fillers; ii) plasticizers; iii) process aids; iv) acid acceptors; v) antioxidants; vi) antiozonants; and vii) combinations thereof.

9. The jacket of claim 8 wherein said filler is selected from the group consisting of carbon black, talc, mica, silica, clay, calcium carbonate, titanium dioxide, colorants and combinations thereof.

10. The jacket of claim 8 wherein said plasticizer is selected from the group consisting of dioctyl phthalate, diisononyl phthalate, dioctyl adipate, trioctyltrimellitate, dioctyl sebacate, diundecyl phthalate, and chlorinated paraffins.

11. The jacket of claim 8 wherein said process aid is selected from the group consisting of paraffin wax and oxidized polyethylene wax.

12. The jacket of claim 7 wherein said curative is selected from the group consisting of organic peroxides and thiadiazoles.

* * * * *